United States Patent [19]

McDonald et al.

[11] Patent Number: 5,102,612
[45] Date of Patent: Apr. 7, 1992

[54] PERMANENT REFUELING POOL SEAL

[75] Inventors: Michael S. McDonald, Palmer, Mass.; Edward A. Siegel, West Hartford, Conn.; George J. Roebelen, Windsor, Conn.; Glen E. Schukei, South Windsor, Conn.; Robert H. Brookins, Somers, Conn.; David J. Ayres, Canton Center, Conn.

[73] Assignee: Combustion Engineering, Inc., Windsor, Conn.

[21] Appl. No.: 363,732

[22] Filed: Jun. 9, 1989

[51] Int. Cl.$^5$ .............................................. G21C 13/00
[52] U.S. Cl. .................................... 376/203; 376/264; 376/288; 376/294
[58] Field of Search ............... 376/203, 205, 208, 294, 376/264, 288

[56] References Cited

U.S. PATENT DOCUMENTS

| | | | |
|---|---|---|---|
| 4,070,221 | 6/1978 | Anthony | 156/245 |
| 4,090,087 | 5/1978 | Weissenfluh | 250/519 |
| 4,650,643 | 3/1987 | Anthony | 376/288 |
| 4,747,993 | 5/1988 | Hankinson et al. | 376/205 |
| 4,753,768 | 6/1988 | Puri | 376/205 |
| 4,904,442 | 2/1990 | Swida et al. | 376/203 |
| 4,905,260 | 2/1990 | Swida et al. | 376/203 |

*Primary Examiner*—Robert L. Stoll
*Assistant Examiner*—N. Bhat
*Attorney, Agent, or Firm*—John H. Mulholland

[57] ABSTRACT

A permanent pool seal and neutron shield 30 for providing an effective water barrier over the annular space 28 between a nuclear reactor vessel flange 24 and a surrounding annular ledge 22 includes annular deck sections 32 supported on spaced ribs 46.

Flexible membranes 50,52 on the deck section peripheries accommodate relative movement. Openings 42, each with a removable plug structure which includes cover 44 and tapered can 60, provide vessel cavity 14 with ventilation and maintenance access. All cans 60 and similar containers 56 and 59 under the deck structure and flange 24 contain a shielding material 58 in the form of a boron-containing concrete. Supported below the cans is refractory insulating material 54.

12 Claims, 3 Drawing Sheets

PERMANENT REFUELING POOL SEAL

BACKGROUND OF THE INVENTION

This invention generally relates to sealing the space between an adjacent nuclear reactor vessel annular flange and a surrounding ledge or plate to provide a water barrier for supporting a liquid in a cavity called a refueling pool. Seals for this purpose are known and are shown, for example, in U.S. Pat. No. 4,214,760 entitled "SEAL FOR ADJACENT PLATES" which issued to Dwaine A. Godfrey, July 29, 1980. Combustion Engineering, Inc., assignee of the instant invention, is the exclusive licensee under the above referenced patent.

The Godfrey type of seal is a temporary seal which is installed during nuclear reactor refueling outages but which is removed for normal reactor operation.

A southern Texas utility has permanently installed a refueling pool seal, although such a permanent installation is not normal. Moreover, it is not believed that others have provided in a permanent pool seal, significant nuclear shielding and insulation. Certainly, the instant structure is an efficient permanent insulated refueling pool seal and neutron shield which has not been known heretofore.

SUMMARY OF THE INVENTION

The present invention comprises a deck structure mounted on radial ribs and provides a number of unique features beyond mere shielding to reduce man-rem exposure and the reduction of maintenance that a permanent pool seal may be expected to offer.

The design of the instant shielded pool seal invention includes flexible seals which accommodate the shearing type loads imposed on a pool seal by the reactor vessel shifting on its sliding pads parallel to the hot leg piping. during reactor operation. In addition, the novel design incorporates a plug/penetration structure in the seal structure that allows access to components in the annulus that require maintenance as well as permits air flow, when open, to cool the reactor cavity wall. The penetration plug has a cover with O-rings to prevent water leakage during flood-up when the pool contains water.

The integrated pool seal-neutron shield of the invention includes shielding material as part of the plug structure as well as in the rest of the annular seal. The shield material of the pool seal and penetration plugs is a boron-containing concrete sold by Reactor Experiments, Inc. of San Carlos, Calif. 94070-3278, as "Heat Resistant Shielding (Catalog No. 277)". The boron content is approximately 1.56%. The hydrogen concentration (which moderates fast neutrons) is approximately one-half that of water. The material maintains its physical integrity at temperature up to 1900° F. (1038° C.) and is easily cast in place. When ordered in pre-cast shapes it can be sawed and drilled.

Refractory insulating material is also utilized in the structure by supporting it adjacent the lower surfaces of the containers into which the shielding material is cast and of the plugs.

The containers of shielding material may be conveniently attached to the deck structure by means of pins on hanging brackets. The pins seat in recesses of holes of bosses attached to the ribs or seal plate. Of course, other mechanical attachments are also possible, but the pin and recess type minimize worker radiation exposure during installation since the containers of shielding material are merely lowered into position and held by gravity.

The annular deck structure is conveniently made in three sections which are bolted together by splice plates. The splice plates have upwardly and downwardly extending threaded studs prewelded in position to minimize man-rem exposure during installation.

DESCRIPTION OF THE PREFERRED EMBODIMENT

Figure 1:
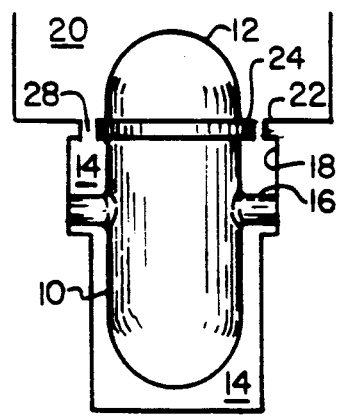
FIG. 1 is a schematic elevational view of a reactor vessel in a reactor vessel cavity with a refueling pool above.

FIG. 1 shows the environment in which the preferred embodiment of the invention is used. A reactor vessel 10 having a vessel head 12 is located in a reactor vessel cavity 14 and suspended therein by the vessel nozzles 16 which find their support within the cavity walls 18. Above the reactor vessel 10 the cavity walls 18 define a refueling canal or pool 20 having a lower boundary defining a refueling canal ledge 22 generally opposite the vessel flange 24 of the vessel 10.

Refueling of the reactor occurs periodically and consists of filling the refueling canal 20 with water, then removing the vessel head 12 from the vessel 10 so that access may be had to the nuclear fuel (not shown) inside the vessel 10. It is imperative, however, that none of the water in the refueling canal 20 leak into the vessel cavity 14 because refueling water would create contamination problems with the vessel 10 and other equipment in the vessel cavity 14. The annular space 28 between the vessel flange 24 and the cavity ledge 22 cannot be sealed during plant operation because of safety and licensing requirements relating to hypothetical accidents which must be accommodated without damage to any components. In particular, if a vessel nozzle 16 breaks, the flashing liquid must have an escape route from the vessel cavity 14 in order to prevent excessive uplift on the vessel 10 which could further complicate an already serious accident. Therefore, the space 28 must be maintained open for ventilation and cooling during normal operations and to permit a steam flow path out of the vessel cavity 14. The space 28 may be sealed only during the reactor refueling operation. It must also provide access for maintenance during an outage.

Figure 2:
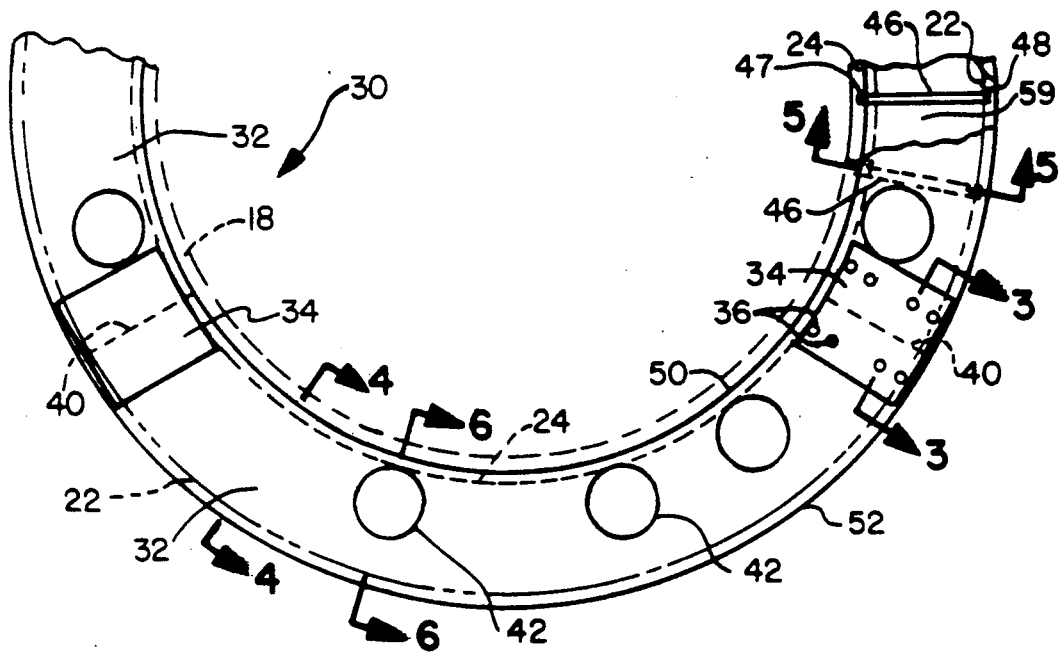
FIG. 2 is a fragmentary schematic plan view with a portion broken away of the permanent refueling pool and shield of the invention.
Figure 3:
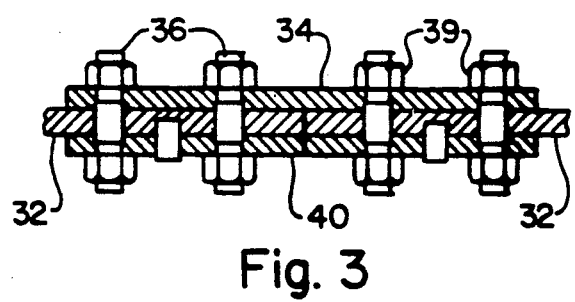
FIG. 3 is a cross-sectional view taken along the line 3—3 of FIG. 2.

FIG. 2 shows the preferred embodiment of the invention in place between the vessel flange 24 and the canal ledge 22. In the illustration of this embodiment of the invention, a reactor cavity or pool permanent seal and neutron shield is generally designated by the numeral 30. The pool seal includes two or three sections 32 having inside and outside diametric dimensions sufficient to span the annulus between flange 24 and ledge 22 and allow for welding. The horizontal plate or deck sections 32 of the seal are of sufficient thickness to allow for its use as a work platform to support head and rector vessel flange area outage activities. The deck sections 32 are joined by splice plates 34, as seen in FIG. 3. Threaded studs 36 are prewelded to the splice plate 34 and lower half-plates 38 are provided for the underside. Nuts 39 are fastened to the studs to complete the section butt joint 40 without the need for welding in containment.

The plate sections 32 include openings 42 with removable seal plugs or covers 44. The openings 42 provide for reactor cavity cooling air flow to keep the concrete cavity wall 18 at temperatures below 150° F. during operation. Also during operation, the reactor cavity seal and neutron shield 30 provides a neutron attenuation factor of approximately 40, thus eliminating a large portion of the neutron streaming phenomenon.

To create a seal between the reactor vessel flange 24 and the cavity ledge 22, the plate sections 32, rest on circumferentially spaced, (approximately every 15 degrees), radially disposed ribs or members 46 which span the annular space 28. The inner ends 47 of ribs 46 are supported by the vessel flange 24 and the outer ends 48 of the ribs 46 are supported by the ledge 22.

In order to make a water-tight seal, the inside and outside diameters of the deck member 32 are welded to flexible membranes 50,52 which are subsequently welded to the reactor vessel flange 24 and ledge 22 on the pool side of the deck member 32. These membranes 50,52 allow for thermal expansions and contractions and for the reactor vessel 10 to "walk" as the system heats up. This may occur due to the fact that the vessel is supported on sliding bearings (not shown). As the system heats up, the expansion force must overcome the friction force holding the steam generators (not shown) in place. Usually one generator will start to move before the other which allows the reactor vessel to move or "walk" in that direction. This places a shearing load on the membranes 50,52. This type of shearing motion is non-asymmetric and results in a complex loading distribution in the deck plate 32.

The deck sections 32, plugs 44 and studs 36 are typically of Type 304 stainless steel. The membranes 50,52 forming the flexible seals are, accordingly, preferably of the same Type 304 material. Typically, membranes 50,52 are 0.15 to 0.20 inches thick with a 4 inch height, a 1½ inch right angle flange and weld at the bottom and a weld connecting them at the top to the deck plate.

Figure 4:
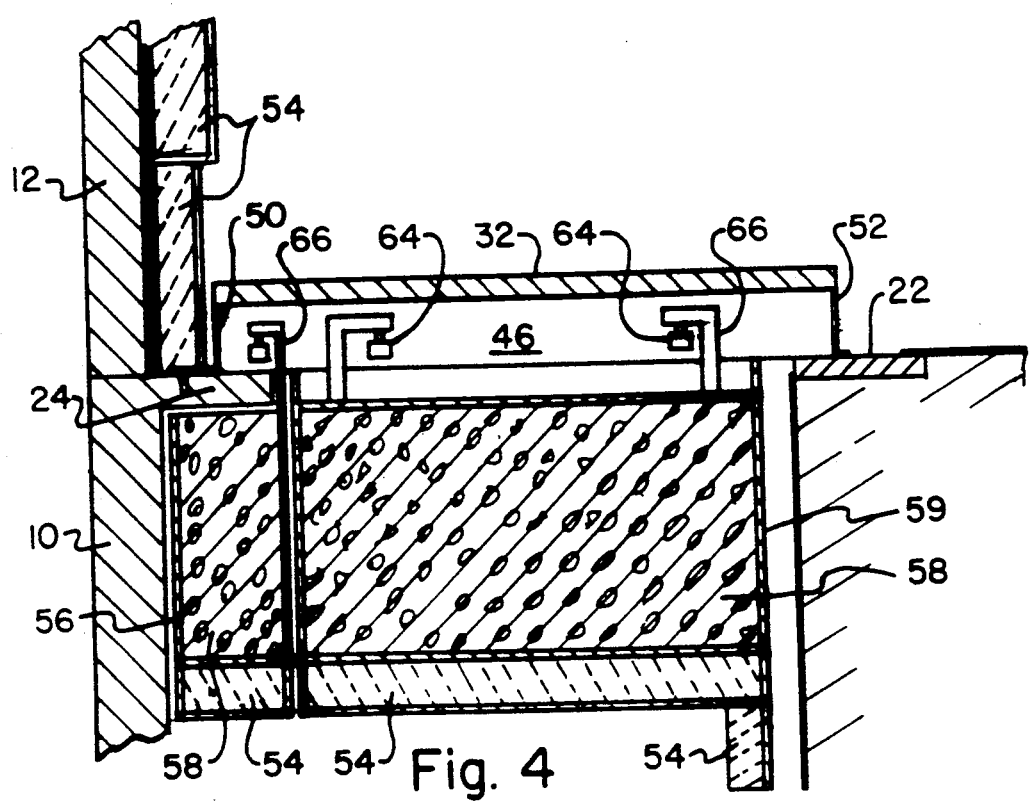
FIG. 4 is a cross-sectional view taken along the line 4—4 of FIG. 2.
Figure 5:
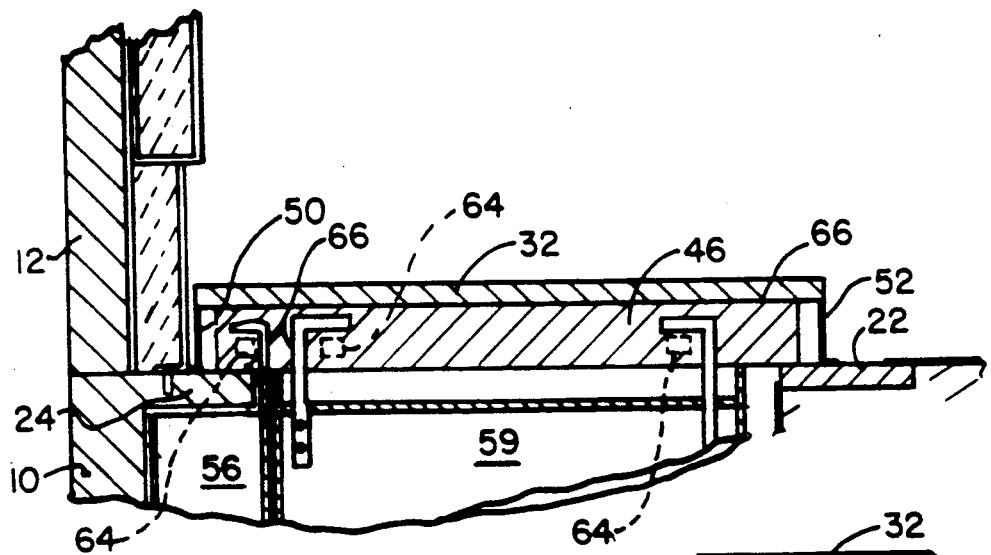
FIG. 5 is a cross-sectional view taken along the line 5—5 of FIG. 2.

As seen in FIGS. 4 and 5, for example, the head 12 is typically protected by an insulating refractory lining 54. Adjacent the lower surfaces of the vessel flange 24 small cans 56 of cast shielding material 58 are hung and below the annular deck plate sections 32 larger cans 59 of material 58 are hung. Insulating refractory material 54 is also provided adjacent the lower surfaces of the containers, attached by suitable mechanical fastening means (not shown).

Beneath the removable plug structure covers 44 are removable plugs 60 in the form of tapered annular cans 60 of material 58 having handles 62 to facilitate their removal for maintenance access and ventilation.

Figure 4A:
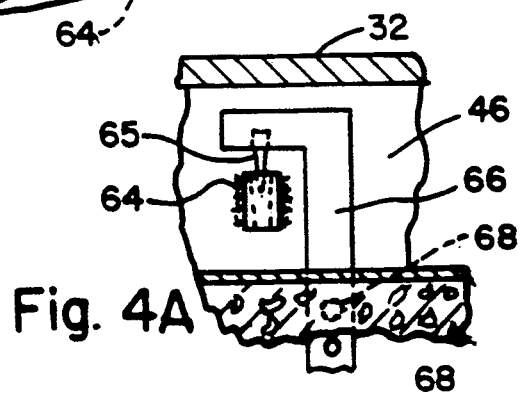
FIG. 4A is an enlarged fragmentary view of a portion of FIG. 4.
Figure 6:
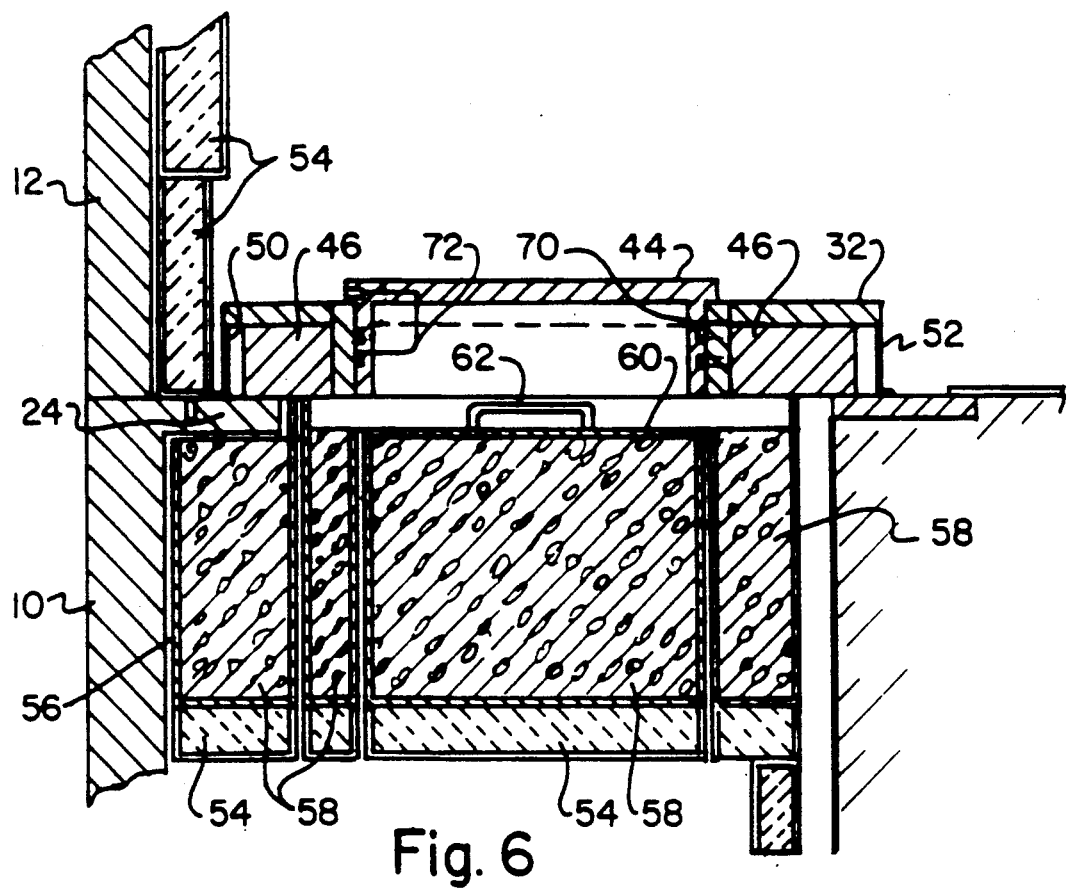
FIG. 6 is a view taken along the line 6—6 of FIG. 2.
Figure 7:
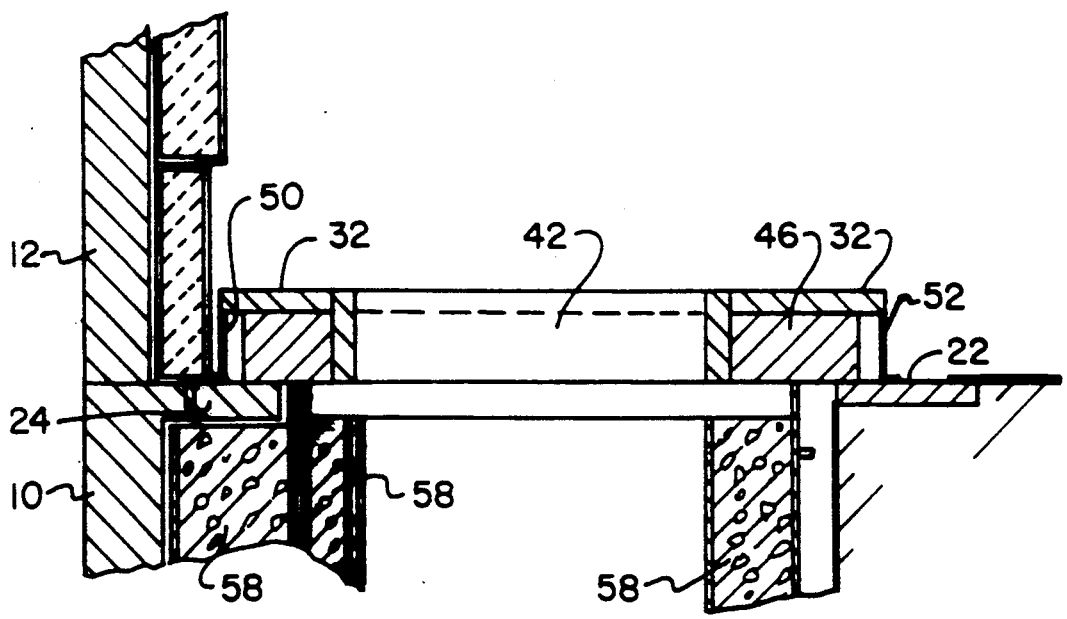
FIG. 7 is a view taken along the line 6—6 with the plug structure removed to provide access and cooling air flow along the reactor cavity wall.

The cans or basket 56 and 59 may be hung from hollow bosses 64 welded to the ribs 46 for receipt of pins 65 projecting downwardly from L-shaped brackets 66 attached by fasteners 68 to the can sides. (See FIG. 4A)

The plug structure covers 44 have peripheral flexible seals in the form of O-rings 70 seated in grooves in the cover wall. The sealing integrity of the redundant O-ring seals is checked by pressure connections and lines 72 by which pressure between the O-rings can be introduced to check the integrity of the seals made by O-rings 70 with the walls of openings 42 through the deck plate sections 32.

What is claimed is:

1. A permanent pool seal and neutron shield for providing an effective water barrier over the annular space between a nuclear reactor vessel flange and a surrounding annular ledge comprising:

an annular space-spanning deck structure supported underneath by circumferentially spaced radially disposed ribs spanning the annular space with the inner ends of the ribs supported by the vessel flange and the outer ends of the ribs supported by the ledge; and flexible seals between the deck structure and the vessel flange and the deck structure and the ledge.

2. The permanent pool seal and neutron shield of claim 1 in which the annular deck structure has neutron shielding and an opening and a removable plug structure whereby access to, and ventilation of, the reactor vessel cavity adjacent the lower vessel wall is effected upon removal of the plug structure.

3. The plug structure of claim 2 in which neutron shielding is included in the plug structure.

4. The plug structure of claim 2 in which insulation is included.

5. The plug structure of claim 2 in which a peripheral flexible seal is included.

6. The plug structure of claim 5 in which means to check the seal in pressurized condition are provided.

7. The plug structure of claim 5 in which redundant flexible seals are included.

8. The permanent pool seal and neutron shield of claim 1 in which the annular neutron shielding deck structure has a plurality of openings and a removable plug structure for each opening.

9. The permanent pool seal and neutron shield of claim 1 in which the neutron shielding material is a heat resistant concrete containing boron.

10. The permanent pool seal and neutron shield of claim 9 in which the neutron shielding material is cast in containers and supported under the deck structure.

11. The permanent pool seal and neutron shield of claim 10 in which the containers are supported by the deck structure and the plug structure in openings in the deck structure.

12. The permanent pool seal and neutron shield of claim 11 in which refractory insulation is provided adjacent the lower surfaces of the containers.

* * * * *